Patented June 22, 1937

2,084,918

UNITED STATES PATENT OFFICE 2,084,918

ALCOHOLIC SUSPENSION OF TITANIUM PIGMENTS

Walter K. Nelson, Metuchen, N. J., assignor, by mesne assignments, to National Lead Company, New York, N. Y., a corporation of New Jersey No Drawing. Application November 5, 1936, Serial No. 109,316

10 Claims. (Cl. 134—58)

This invention relates to the preparation of alcoholic suspensions of titanium pigments. It has particular reference to suspensions of titanium dioxide in aliphatic alcohols of lower molecular weight.

In my copending application, Serial No. 726,578, I have disclosed a method for dispersing calcined titanium pigments in aqueous media by means of certain novel dispersing agents. I have found that these agents are also effective in dispersing titanium pigments in alcoholic media. This is most surprising because, as is well established, there are as yet no underlying principles according to which solids may be dispersed or suspended in liquids. Generally speaking, the problem of dispersing any solid in any liquid must be solved as an individual problem unrelated to the dispersion of another solid in another, or even the same, liquid. It follows, therefore, that the substance which functions as a dispersing agent for a solid in a liquid possessing certain chemical and physical properties may not necessarily function as a dispersing agent for the same solid in another liquid having different chemical and physical properties. For example, triethanolamine, sulfonated olive oil, ivory soap, glycerine and certain other substances function as dispersing agents for titanium pigments in aqueous media but are absolutely ineffective as dispersing agents for suspending or dispersing titanium pigments in alcoholic media.

An object of my invention is the production of alcoholic dispersions of titanium pigments. This and other objects will become apperent from this description of my invention.

The dispersing agents useful in the practice of my invention may be described as the acid-reacting halides, including the chlorides, fluorides, bromides, etc., of aluminum, iron, thorium, titanium, zirconium, cerium and thallium, in which these elements are in the condition of highest valence. Generally speaking, from the point of view of availability and alcoholic solubility the chlorides of the aforementioned metals are best adapted for the practice of the present invention. Aluminum chloride is particularly effective.

The quantity of dispersing agent employed in the practice of the present invention is small. I have found that for most purposes the amount between 0.1% and 2%, preferably 0.1% to 0.5%, based on the weight of the alcohol is usually effective in dispersing titanium pigments in aliphatic alcohols.

While my invention is particularly adaptable for use in preparing suspensions of titanium pigments in a lower molecular weight aliphatic alcohols having six or less carbon atoms in the molecule, it is generally adaptable for preparing alcoholic dispersions of titanium pigments in liquid aliphatic alcohols of higher molecular weight. It is equally useful regardless of whether the alcohol is a primary, secondary or tertiary alcohol.

The dispersion of the titanium pigment may conveniently be carried out according to the present invention by preparing a saturated solution of the dispersing agent in the desired alcohol, separating any undissolved portion, for example, by filtration, and if a quantity of dispersing agent in excess of that required has been dissolved diluting with additional alcohol. On the other hand, the requisite quantity of dispersing agent may be dissolved in the alcohol prior to or during the admixture of the titanium pigment.

The titanium pigment may be dispersed or suspended in the alcoholic media by intimately mixing the titanium pigment in the alcohol in admixture with the dispersing agent. Such mixture may conveniently be effected by vigorous agitation, for example, by means of a mechanical stirring device, or the pigment may be milled in a ball-mill or similar device together with the alcohol and the dispersing agent.

A convenient method of preparing the alcoholic titanium pigment suspensions of the present invention may be carried out by first preparing a slurry or paste containing a relatively large amount of titanium pigment and then diluting this slurry or paste with additional alcohol to obtain the desired proportions.

Having thus described my invention the following specific examples are given for illustrative purposes from which, however, no undue limitations are to be construed.

*Example No. 1*

5 grams of titanium tetrachloride, $TiCl_4$, are dissolved in 1000 grams of methyl alcohol, $CH_3OH$. To this solution are added, with vigorous agitation, furnished by a mechanical stirrer, 250 grams of calcined pigmentary titanium dioxide. The resulting mixture is stirred until a uniform and homogeneous suspension is obtained.

The resulting methyl alcoholic dispersion of titanium dioxide contains no coarse or aggregated particles; the finely divided titanium dioxide settles out of suspension only very slowly over a long period of time and can be again readily suspended by simple agitation or shaking. A similar mixture of methyl alcohol and titanium dioxide prepared without the use of titanium tetrachloride settles practically at once, as soon as the agitation ceases.

Example No. 2

50 grams of aluminum chloride, $AlCl_3.6H_2O$, 10 kilograms of ethyl alcohol, $C_2H_5OH$, and 20 kilograms of titanium dioxide of calcined pigmentary titanium dioxide are milled together in a ball-mill for about one hour.

The resulting ethyl alcoholic dispersion is in the form of a thick paste containing about 2 parts of titanium dioxide for 1 part of ethyl alcohol. This paste can serve as a master batch for the preparation of suspensions containing any desired amount of titanium dioxide.

Example No. 3

3.5 grams of ferric chloride, $FeCl_3.6H_2O$, dissolved in 1000 grams of isopropyl alcohol $(CH_3)_2CH.OH$. To the resultant solution 200 grams of a co-precipitated titanium dioxide-barium sulfate composite pigment are added with vigorous agitation. The agitation is continued until the composite titanium pigment is suspended in uniform and homogeneous dispersion throughout the isopropyl alcohol.

The isopropyl composite titanium pigment dispersion so obtained is a substantially permanent suspension, the pigment settling only very slowly. However, because of the tendency of the titanium pigment to absorb iron with consequent discolorations the product of this example is slightly yellow. Generally, ferric halides should not be employed where pure white suspensions are demanded.

The novel dispersions contained in the practice of the present invention are particularly adaptable for the manufacture of inks, shoe-polish and other materials where the demand exists for quick-drying non-aqueous pigment suspensions.

The foregoing description has been given for clearness of understanding and no undue limitations should be deduced therefrom but the appended claims should be construed as broadly as possible in the light of the prior art.

I claim:

1. A method for the production of alcoholic dispersions of titanium pigments which comprises intimately mixing a finely-divided titanium pigment in an aliphatic alcohol in admixture with a relatively small amount of an acid-reacting salt selected from the group consisting of the halides of aluminum, iron, thorium, titanium, zirconium, cerium, and thallium in which these elements are in the condition of highest valence.

2. A method for the production of alcoholic dispersions of titanium pigments which comprises intimately mixing a finely-divided titanium pigment in an aliphatic alcohol having at the most six carbon atoms in the molecule in admixture with an amount of an acid-reacting salt selected from the group consisting of the halides of aluminum, iron, thorium, titanium, zirconium, cerium, and thallium in which these elements are in the condition of highest valence between 0.1% and 2.0% based on the weight of the alcohol.

3. A method for the production of alcoholic dispersions of titanium pigments which comprises intimately mixing a finely-divided titanium pigment in an aliphatic alcohol having at the most six carbon atoms in the molecule in admixture with an amount of aluminum chloride between 0.1% and 2.0% based on the weight of the alcohol.

4. A method for the production of dispersions of titanium dioxide in ethyl alcohol which comprises intimately mixing finely-divided titanium dioxide in ethyl alcohol in admixture with an amount of aluminum chloride between 0.1% and 2.0% based on the weight of the ethyl alcohol.

5. A method for the production of alcoholic dispersions of titanium pigments which comprises first intimately mixing a finely-divided titanium pigment in an aliphatic alcohol in admixture with a relatively small amount of an acid-reacting salt selected from the group consisting of the halides of aluminum, iron, thorium, titanium, zirconium, cerium, and thallium in which these elements are in the condition of highest valence to form a paste, then adding to the so-formed paste an additional quantity of aliphatic alcohol to obtain a free-flowing uniform dispersion of the said titanium pigment in the said aliphatic alcohol.

6. A method for the production of alcoholic dispersions of titanium pigments which comprises first intimately mixing a finely-divided titanium pigment in an aliphatic alcohol in admixture with an amount of an acid-reacting salt selected from the group consisting of the halides of aluminum, iron, thorium, titanium, zirconium, cerium, and thallium, in which these elements are in the condition of highest valence between 0.1% and 2.0% based on the weight of the alcohol to form a paste, then adding to the so-formed paste an additional quantity of aliphatic alcohol to obtain a free-flowing uniform dispersion of the said titanium pigment in the said aliphatic alcohol.

7. A method for the production of alcoholic dispersions of titanium pigments which comprises first intimately mixing a finely-divided titanium pigment in an aliphatic alcohol in admixture with aluminum chloride between 0.1% and 2.0% based on the weight of the alcohol to form a paste, then adding to the so-formed paste an additional quantity of aliphatic alcohol to obtain a free-flowing uniform dispersion of the said titanium pigment in the said aliphatic alcohol.

8. A method for the production of dispersions of titanium dioxide in ethyl alcohol which comprises first intimately mixing finely-divided titanium dioxide in ethyl alcohol in admixture with an amount of aluminum chloride between 0.1% and 2.0% based on the weight of ethyl alcohol to form a paste then adding to the so-formed paste an additional quantity of ethyl alcohol to obtain a free-flowing uniform dispersion of titanium dioxide in ethyl alcohol.

9. As a new article of manufacture, a free-flowing liquid, substantially non-separating dispersion of a titanium pigment evenly and uniformly distributed in an aliphatic alcohol containing a small amount of an acid-reacting salt selected from the group consisting of the halides of aluminum, iron, thorium, titanium, zirconium, cerium, and thallium in which these elements are in the condition of highest valence.

10. As a new article of manufacture a free-flowing, substantially non-separating dispersion of titanium dioxide evenly and uniformly distributed in ethyl alcohol, containing a small amount of aluminum chloride.

WALTER K. NELSON.